United States Patent [19]

Idogaki et al.

[11] Patent Number: 4,491,815
[45] Date of Patent: Jan. 1, 1985

[54] ROTARY ACTUATOR

[75] Inventors: Takaharu Idogaki, Okazaki; Hisasi Kawai, Toyohashi; Kyo Hattori, Susono; Kazuhiro Sakurai, Gotenba, all of Japan

[73] Assignees: Nippon Soken, Inc., Nishio; Toyota Jidosha Kabushiki Kaisha, Toyota, both of Japan

[21] Appl. No.: 487,760

[22] Filed: Apr. 22, 1983

[30] Foreign Application Priority Data

Apr. 26, 1982 [JP] Japan .................................. 57-68751

[51] Int. Cl.³ .............................................. H01F 7/08
[52] U.S. Cl. ..................................... 335/229; 335/272
[58] Field of Search ............... 335/229, 230, 272, 276; 310/156

[56] References Cited

U.S. PATENT DOCUMENTS 3,434,082 3/1969 Montagu ............................. 335/229
3,694,782 9/1972 Ray ..................................... 335/230

FOREIGN PATENT DOCUMENTS 852714 10/1960 United Kingdom ................ 335/295

Primary Examiner—George Harris
Attorney, Agent, or Firm—Cushman, Darby & Cushman

[57] ABSTRACT

A rotary actuator for driving a fluid control valve comprises a yoke which forms a closed magnetic path an excitation coil which produces a magnetic flux in the yoke, a permanent magnet which is rotatably arranged in a through hole or in a slit formed in the yoke, and a restoring spring which produces a force acting against a rotational torque generated in the magnet by a main magnetic flux which flows through the yoke and the permanent magnet when the excitation coils is energized. Shielding portions are formed on both sides of the ends of the yoke, which ends oppose the permanent magnet, so as to substantially shield the permanent magnet together with the ends of the yoke, whereby a magnetic reluctance of a path of the magnetic flux remains substantially constant irrespective of the rotating position of the permanent magnet with respect to the yoke when the excitation coil is de-energized.

4 Claims, 7 Drawing Figures

ROTARY ACTUATOR

BACKGROUND OF THE INVENTION

1. Field of the Invention

The present invention relates to a proportional control actuator and, more particularly, to a rotary actuator of the type which uses a proportional solenoid, in which an angle of rotation of a rotating shaft is determined by the balance between a rotational torque of a rotary magnet and the restoring force of a restoring spring.

2. Description of the Prior Art

In a conventional proportional control actuator for driving a fluid control valve, a proportional solenoid and a core move linearly relative to each other. For this reason, the stroke of the core or solenoid is small, and a fluid channel must therefore be enlarged in cross-sectional area in order to perform flow rate control of a large amount of fluid. This results in a very large fluid control valve. Furthermore, since the core or solenoid moves linearly, the overall actuator is subject to mechanical vibration.

SUMMARY OF THE INVENTION

It is therefore an object of the present invention to provide a proportional control actuator in which the stroke of a proportional solenoid or core is sufficiently long, and which is resistant to mechanical vibration.

It is another object of the present invention to provide a rotary actuator which is capable of producing a rotation output at a given rotation angle which substantially corresponds to a supplied current.

It is still another object of the present invention to provide a rotary actuator which is capable of moving smoothly in proportion to a supplied current.

The above objects are achieved by a rotary actuator comprising: a yoke for forming a closed magnetic path; an excitation coil partially wound on the yoke for producing a magnetic flux in the yoke; a permanent magnet rotatably arranged in a through hole or in a slit formed in a part of the yoke; a restoring spring for producing a force acting against a rotational torque generated in the permanent magnet by a main magnetic flux which flows through the yoke and the permanent magnet when the excitation coil is energized; and shielding portions formed on both sides of the ends of the yoke which oppose the permanent magnet for substantially shielding the permanent magnet together with the ends of the yoke, whereby a magnetic reluctance of a path of the magnetic flux remains substantially constant irrespective of a rotating position of said permanent magnet with respect to the yoke when the excitation coil is de-energized.

The above and other related objects and features of the present invention will be apparent from the description of the present invention set forth below, with reference to the accompanying drawings, as well as from the appended claims.

DESCRIPTION OF THE PREFERRED EMBODIMENTS

Figure 1:
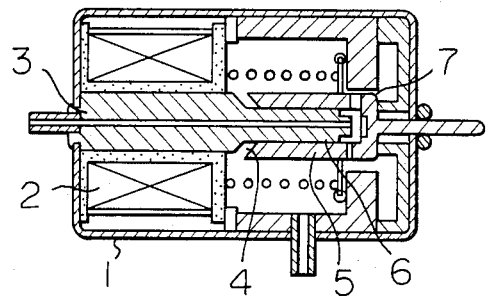
FIG. 1 is a sectional view of a proportional control actuator of the prior art.

Before describing a proportional control actuator of the present invention, a conventional proportional control actuator will first be described with reference to the accompanying drawings. The conventional actuator for driving a fluid control valve, shown in FIG. 1, is of the type wherein a proportional solenoid or core moves linearly. Referring to FIG. 1, a cylindrical coil 2 is arranged inside a cylindrical housing 1 and a core 3 is arranged at the center of the coil 2. A plunger 5 is disposed next to the core 3 with a given air gap 4 therebetween, thereby constituting a movable portion. An oil-impregnated plastic member 6 is disposed at the center of the core 3 and supports the plunger 5 at one of its ends. The flow rate of air flowing through an air path 7 is proportionally controlled.

In the conventional proportional control actuator as described above, the plunger 5 can only move for a stroke of about 5 mm. When an actuator of this type is applied to a flow control valve for an exhaust gas treatment apparatus for a vehicle, flow control of 0 to 600 l/min must be performed. This means that the air path 7 must have a diameter of 14 mm. For this reason, the overall flow rate control mechanism becomes large in size as has been described above. Furthermore, since the air gap 4 is opened/closed by the linear movement of the plunger 5, the actuator is subject to mechanical vibration.

Figure 2:
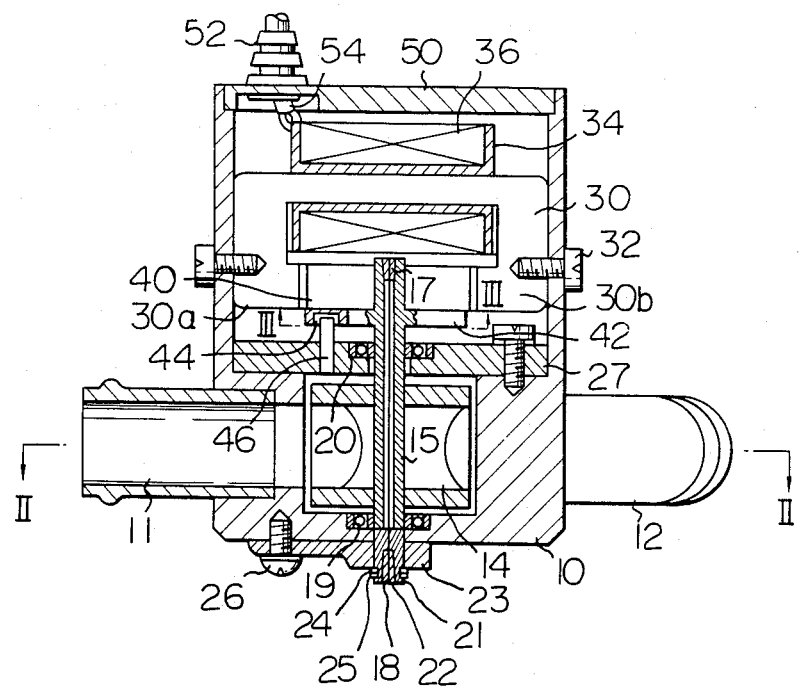
FIG. 2 is a longitudinal sectional view of a proportional control actuator according to an embodiment of the present invention.
Figure 3:
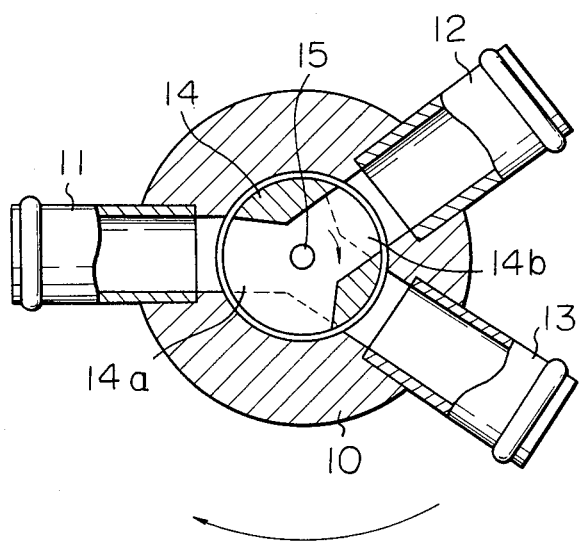
FIG. 3 is a sectional view along the line II—II in FIG. 2.
Figure 4:
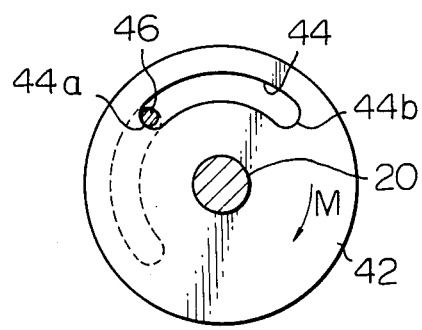
FIG. 4 is a sectional view along the line III—III in FIG. 2.

A proportional control actuator according to an embodiment of the present invention will now be described. In FIG. 2 is shown a longitudinal sectional view of the actuator, while in FIG. 3 is shown a sectional view along the line II—II in FIG. 2. The actuator of this embodiment is of the proportional solenoid type with a three-port connection valve for controlling the flow rate of air. Referring to FIGS. 2 and 3, first, second, and third pipes 11, 12, and 13, respectively, are connected to a valve case 10. A rotor 14 is located inside the valve case 10. A valve shaft 15 is inserted along the central axis of the rotor 14. One end of the valve shaft 15 is pivotally supported by the valve case 10 through ball bearings 19. The other end of the valve shaft 15 is pivotally supported by a valve cover 27 through ball bearings 20. The valve shaft 15 is hollow and stores a torsion bar 18 as a restoring spring therein. One end of the torsion bar 18 is securely fixed in position by being inserted in a holder 17 pressed into the valve shaft 15. The holder 17 is tapered to have a larger diameter toward the outside the valve shaft 15 and has a hole inside for receiving the torsion bar 18. The other end of the torsion bar 18 is fixed in position by being inserted in a holder 22 of the same structure as the holder 17 pressed into a thrust holder 21. An adjuster 23 has a hole at its one end which receives the thrust holder 21. A cir-clip 24 and a shim 25 are inserted in grooves formed around the outer surfaces of the thrust holder 21. Thus, the thrust holder 21 is securely held in position and the torsion bar 18 may not be loosened. An arcuated elongate hole is formed in the other end of the adjuster 23 to receive a screw 26. The adjuster 23 is fixed to the valve case 10 by fastening the screw 26. The adjuster 23 is fixed by rotating the thrust holder 21 in the circumferential direction of the valve case 10 for adjusting the torsion bar 18.

The rotor 14 has inlet and outlet ports 14a and 14b with sector-shaped ends, as shown in FIG. 3. The inlet and outlet ports 14a and 14b communicate with each other. When the rotor 14 is at the position indicated by the solid line, the first pipe 11 communicates with the second pipe 12. When the rotor 14 rotates in the direction indicated by the arrow, the first pipe 11 then communicates with the third pipe 13, as indicated by the broken line. As the rotor 14 further rotates from the position indicated by the solid line to the position indicated by the broken line, the opening defined between the rotor 14 and the pipe 12 gradually narrows and is fully closed when the rotor 14 reaches the position indicated by the broken line.

Figure 5:
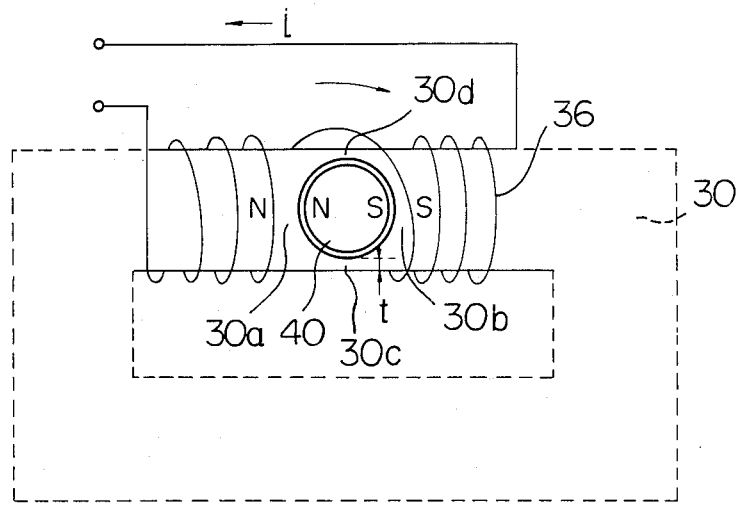
FIG. 5 is a representation for explaining the mode of operation of the actuator shown in FIG. 2.

Meanwhile, the opening defined between the rotor 14 and the pipe 13 gradually opens from its fully closed state and becomes fully open when the rotor 14 reaches the position indicated by the broken line. Accordingly, a fluid (e.g., air) supplied from a fluid source communicating with the first pipe 11 may be supplied to the second or third pipe 12 or 13, in accordance with the position of the rotor 14, at a continuously changing flow rate. The mechanism for moving the rotor 14 in this manner will now be described. A magnetic yoke 30 is mounted inside the valve case 10 by screws 32. A spool 34 is inserted in the yoke 30, and an excitation coil 36 is wound around the spool 34. The yoke 30 has opposite ends 30a and 30b, which are magnetized to opposite poles, and diametrically oppose each other, as shown in FIG. 5. A rotary magnet (permanent magnet) 40 of a cerium-type rare earth element is arranged between these ends 30a and 30b. As shown in FIG. 2, the rotary magnet 40 is placed on a disc 42 which is formed integrally with the valve shaft 15, and is adhered thereto with an adhesive. An arcuated groove 44 is formed in the disc 42 subtending an angle of less than 180° at the center thereof, to receive the upper end of a stopper pin 46. The lower end of the stopper pin 46 is pressed into the valve cover 27. In this manner, the valve shaft 15 and, hence, the rotor 14, can rotate between a first position (solid line) at which the stopper pin 46 abuts against one end 44a of the arcuated groove 44 and a second position (broken line) at which the stopper pin 46 abuts against the other end 44b of the groove 44. An end plate 50 is pressed into the valve case 10 so as to complete the assembly. The end plate 50 has a rubber grommet 52 through which a lead wire 54 connected to the winding tip of the coil 36 extends.

Figure 6:
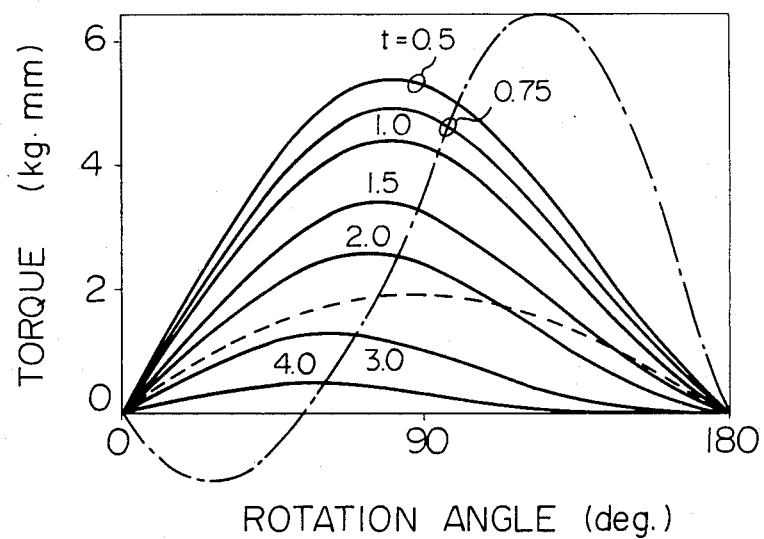
FIG. 6 is a graph of the torque (kg/mm) as a function of the angle of rotation (degree)

In the representation shown in FIG. 5, one of the opposite ends of the rotary magnet 40 is magnetized to the N pole, while the other end is magnetized to the S pole. The broken line of the yoke 30 indicates a closed magnetic path. Shielding portions 30c and 30d as the side walls of the hole formed in the yoke 30 are important elements of the present invention. In FIG. 6 is shown the relationship between the torque (kg/mm) as a function of the angle of rotation (degree) of the rotary magnet 40, when a thickness t of the shielding portion 30c is equal to that of the shielding portion 30d. The graph shown in FIG. 6 corresponds to a case wherein the yoke has a cross-sectional area of $10 \times 12$ mm$^2$, and 1,300 amp-turn. Note that in FIG. 6 the torque is plotted along the ordinate axis and the angle of rotation is plotted along the abscissa axis. As has been described earlier, the rotary magnet 40 is magnetized to the N and S poles. When the coil 36 is energized, the end 30a is magnetized to the N pole, and the end 30b is magnetized to the S pole. In FIG. 5 is shown a case wherein the rotation angle is 0°. Referring to FIG. 6, solid curves correspond to cases wherein the thickness t of the shielding portions 30c and 30d of the yoke 30 is used as a parameter, and the dashed curve corresponds to a case wherein the yoke 30 is absent and a coil is wound around the rotary magnet, with the amp-turn remaining constant in each case. The curve indicated by alternate long and short dashes corresponds to a case wherein the shielding portions are significantly separated from each other. As may be seen from FIG. 6, a greater torque may be obtained with the yoke than without the yoke. When the shielding portions are eliminated to form a closed magnetic path, the detent torque increases significantly as indicated by the alternate long and short dashed line, and the range of rotation may not be effectively utilized. If the thickness t of the shielding portions 30c and 30d is increased, the detent torque decreases. However, if the thickness t is decreased, the magnetic flux generated by the coil 36 permeates through the shielding portions 30c and 30d, so that they may not affect the rotary magnet 40, and the torque is decreased. The thickness t of the shielding portions 30c and 30d is most preferably about 0.75 mm. The term detent torque used herein means a torque of a magnitude such that it rotates the rotary magnet 40 by the force of attraction between the rotary magnet 40 and the yoke 30, even if a current is not supplied to the coil 36.

It is seen from the graph shown in FIG. 6 that when the thickness t is 0.75 mm, a maximum torque is obtained when the angle of rotation is about 80°. The torsion bar 18 is designed to provide a restoring force equivalent to this torque. One end of the torsion bar 18 is fixed to the valve case 10 by means of the thrust holder 21, the holder 22, and the adjuster 23. The other end of the torsion bar 18 is fixed to the holder 17. Therefore, the restoring force of the torsion bar 18 increases as the rotary magnet 40 rotates in the direction indicated by the arrow. Thus, the restoring force acts in the opposite direction to that indicated by the arrow and in proportion to the angle of rotation, thereby providing a rotational torque proportional to the current supplied to the coil 36. The maximum angle of rotation is 80°. Since the valve shaft 15 is integrally formed with the rotary magnet 40, it rotates together with the rotary magnet 40. When the current flowing in this coil 36 increases, referring to FIG. 3, the rotor 14 rotates in the direction indicated by the arrow. The overlapping portions between the openings of the rotor 14, the second pipe 12, and the third pipe 13 comprise an air path the opening whereof must be controlled. The flow rate of air passing through the second pipe 12 decreases and the flow rate of air passing through the third pipe 13 increases with an increase in the current flowing in the coil 36, thereby providing flow rate control.

In the embodiment described above, a torsion bar is used for the restoring spring; however, a coil spring may also be used. The adjuster 23 is incorporated to adjust the start point whereat the restoring force of the torsion bar 18 begins to act; after adjustment, the adjuster 23 is fixed by the screw 26.

Figure 7:
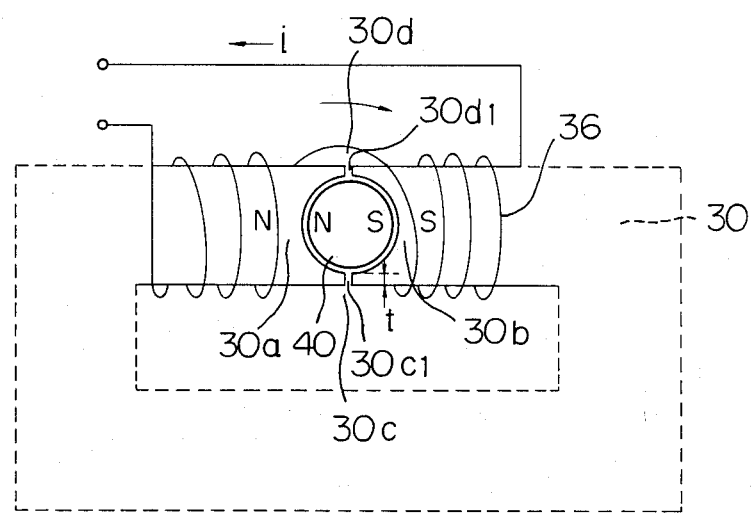
FIG. 7 is a representation of the mode of operation of a proportional control actuator according to another embodiment of the present invention.

In FIG. 7 is shown a proportional control actuator according to another embodiment of the present invention. The actuator of this embodiment differs from that shown in FIG. 5 in that shielding portions 30c and 30d are not complete shielding portions of a ferromagnetic material; small slits 30c1 and 30d1 are formed therein to divide the yoke 30 into two portions.

Even when slits are formed in this manner to form air gaps, the portions 30c and 30d remain substantially shielding portions, provided the slits are not too large. Thus, cogging of the rotary magnet 40 may be satisfactorily prevented.

At ends 30a and 30b of such a yoke which oppose a rotary magnet 40, the magnetic flux produced in the yoke by an excitation coil 36 may be divided into the main magnetic flux passing through the rotary magnet 40 and the bypass magnetic flux passing through the slits 30c1 and 30d1 of the shielding portions 30c and 30d. In this case, the effective cross-sectional area of the magnetic flux path of the shielding portions is decreased so that a small bypass magnetic flux saturates the shielding portions. Thus, the intensity of the bypass magnetic flux may be decreased in comparison with the main magnetic flux.

With the shielding portions as shown in FIG. 5 or 7, the operation as described below is performed when the excitation coil 36 is not energized. Since the rotary magnet 40 comprises substantially a closed magnetic path with members of a material which relatively easily permeate the magnetic flux, the magnetic reluctance of the magnetic path from the N pole to the S pole remains substantially the same irrespective of the positions of the poles S and N of the rotary magnet 40. Accordingly, the permeance of the magnetic path of the magnetic flux from the rotary magnet 40 hardly fluctuates. This guarantees smooth rotation of the actuator without cogging.

The shielding portions may be made of a ferro-magnetic material which is the same as that used for the yoke 30. Alternatively, another magnetic material may be used.

In short, as mentioned above, in accordance with a proportional control actuator according to the present invention, since a core forming a closed magnetic path is arranged in the magnetized portion, a large rotational torque may be obtained with a small increase in amp-turn. Due to the presence of shielding portions for shielding the magnetic flux, stepped rotation (cogging) is prevented irrespective of the presence of the core.

Thus, a wide range may be obtained for the angle of rotation, and a rotational torque may be obtained which is substantially proportional to the current flowing through the coil.

As many widely different embodiments of the present invention may be constructed without departing from the spirit and scope of the present invention, it should be understood that the present invention is not limited to the specific embodiments described in this specification, except as defined in the appended claims.

We claim:

1. A rotary actuator comprising:
    a yoke for forming a closed magnetic path;
    an excitation coil partially wound on said yoke for producing a magnetic flux in said yoke;
    a permanent magnet rotatably arranged in a through hole of said yoke;
    a restoring spring for producing a force acting against a rotational torque generated in said permanent magnet by a main mgnetic flux which flows through said yoke and said permanent magnet when said excitation coil is energized; and
    shielding portions formed on both sides of the ends of said yoke, which ends oppose said permanent magnet, for substantially shielding said permanent magnet together with said ends of said yoke;
    whereby a magnetic reluctance of a path of the magnetic flux remains substantially constant irrespective of a rotating position of said permanent magnet with respect to said yoke when said excitation coil is deenergized.

2. A rotary actuator as claimed in claim 1, wherein said shielding portions comprise a ferromagnetic substance.

3. A rotary actuator as claimed in claim 1, wherein said shielding portions comprise the same material as the material of said yoke, and said permanent magnet located within said through hole is completely surrounded by said ends of said yoke and said shielding portions.

4. A rotary actuator as claimed in claim 1, wherein said permanent magnet comprises a columnar magnet which is arranged in a circular through hole formed in said yoke to be concentric with said through hole, and said shielding portions have the same shape and are arranged in a direction perpendicular to the direction of flow of the magnetic flux in said yoke.

* * * * *